A. F. BATCHELDER.
POWER TRANSMISSION AND ELECTRIC BRAKING.
APPLICATION FILED SEPT. 11, 1920.
1,421,894.
Patented July 4, 1922.
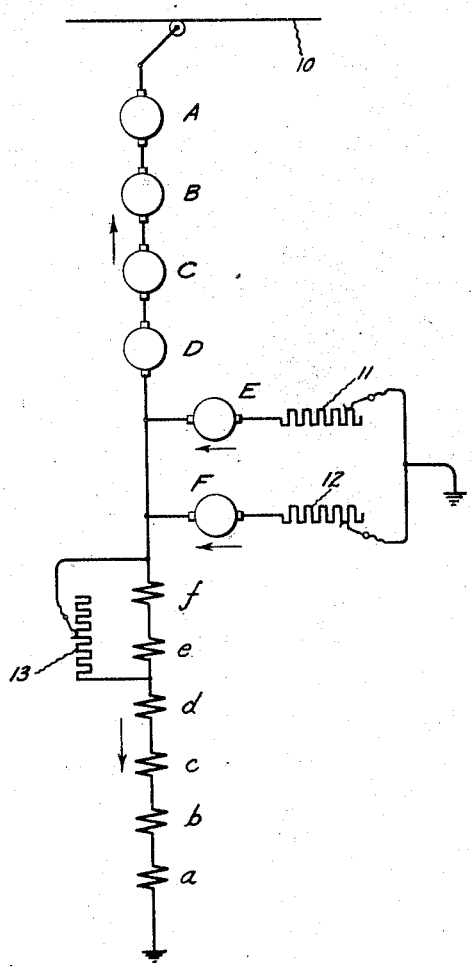
Inventor:
Asa F. Batchelder,
by Albert G. Davis,
His Attorney.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

POWER TRANSMISSION AND ELECTRIC BRAKING.

1,421,894. Specification of Letters Patent. Patented July 4, 1922.

Application filed September 11, 1920. Serial No. 409,647.

*To all whom it may concern:*

Be it known that I, ASA F. BATCHELDER, a citizen of the United States, residing at Schenectady, in the county of Schenectady, State of New York, have invented certain new and useful Improvements in Power Transmission and Electric Braking, of which the following is a specification.

My invention relates to systems of power transmission and electric braking, and in particular to systems wherein a plurality of dynamo electric machines are caused to operate as motors to drive a load, or as generators driven by the load to retard the load.

Although not limited to such use, my invention has a particular usefulness in the control of the electric driving motors of an electric vehicle, such for instance as an electric locomotive or the like.

My invention provides improved means whereby the braking effect is very nicely controlled in a simple and effective manner, and the arrangement is such that when the system is used to brake a load electrically by delivering energy to a source of supply, fluctuations in the voltage of the source of supply and in the braking current are automatically compensated for. A simple and effective arrangement is provided which has an inherently compensating effect to take care of these fluctuations.

My system is of the type in which, during braking, a portion of the machines operates as an exciter for the remainder of the machines. In particular, my invention relates to a system of this character in which the dynamo electric machines are series wound and the exciter portion of the machines is self-excited. One of the objects of my invention is to provide an improved arrangement for electric braking which inherently compensates for changes of braking current and one in which the exciter portion of the machines may be fully loaded so as to deliver its full quota of braking effort. A further object is to provide a system in which the braking effect can be very accurately controlled at the will of the operator in a simple and effective manner. A still further object is to provide a braking arrangement in which a portion of the machines operates as a self-excited exciter for the remainder of the machines, which will operate satisfactorily for motoring operation if that is desired. Other objects of my invention will be fully pointed out in the following description of the invention. Reference is had to the accompanying drawing in which I have shown in very simplified diagram an embodiment of my invention for purposes of illustration and in which a plurality of dynamo electric machines having armatures A, B, C, D, E and F and fields $a$, $b$, $c$, $d$, $e$ and $f$ respectively are operatively connected to a supply circuit indicated as a trolley wire 10, the other side of the supply circuit being the ground connection as shown. These dynamo electric machines are adapted to operate as series motors to drive the load, and they may be connected in various relations such as series, series parallel, or parallel. I have not illustrated a particular form of controller for connecting the motors in various relations for motoring or for establishing the braking connections, since those skilled in the art will readily supply a controller and connections whereby the motors may be connected in any relation desired. In the drawing I have merely indicated a very simplified diagram of the connections established during electric braking, since this is of the essence of my invention. It will be observed that the series fields of the machines are connected in a local circuit with the armatures E and F of the exciter portion of the machines. It will also be observed that the exciter armatures E and F are connected in multiple with each other in series relation with the armatures of the remainder of the machines across the supply circuit, and that the armature E has a resistor 11 in series therewith and the armature F has a resistor 12 in series therewith. These resistors 11 and 12 I have termed balancing resistors, since a part of their functions is to balance the loads of the exciters. The series fields $e$ and $f$ of the exciter portion of the machines are shunted by means of a variable resistor 13 which provides a means for varying the excitation of the exciters and thereby varying the braking effect by shunting a portion of the current in the local circuit around the exciter field windings. It will be observed that during braking the braking current has a path through the resistors 11 and 12, the exciter armatures E and F, and through the armatures D, C, B and A of the remainder of the dynamo electric machines, and that only the current in the local circuit flows through the field windings of the machines. The direction of current in the braking circuit and in the local circuit is as shown by the arrows. The respective loads of the exciters may be varied by varying the resistors 11 and 12, and the multiple circuit, including the exciter armatures, is the only circuit which carries the combined braking and excitation current. That means that the armatures E and F and their respective field windings $e$ and $f$ may be exactly the same as the armatures and field windings of the remainder of the machines. Those skilled in the art will readily perceive the advantages of an arrangement in which all of the machines of the system are similar to each other.

The resistors 11 and 12 have important functions in my system. In the first place, these resistors provide means whereby the exciters may carry their full portion of the load, and the distribution of load between the exciters may be apportioned. Because of the fact that the field windings of the machines are relatively highly inductive as compared to the armatures of the exciters, the resistors provide a resistance in the armature circuit of the machines which permits the field windings to be sufficiently energized at the start of both the motoring and the braking operations. Furthermore, if the machines were connected as shown and the scheme used for motoring while the connections are as shown for regenerating, the resistors make it possible for the machines to operate as motors, since without these resistors the field windings of the machines may not receive a sufficient amount of current. In case a plurality of sets of the same number of machines are used, the sets being connected in multiple, each set connected in accordance with my invention, the resistors provide a means whereby the respective loads of the sets of machines may be balanced so that one set of the machines may deliver substantially the same braking effort as the other set or sets of machines. In case a plurality of sets of machines are connected in series relation, the resistance value of the resistors in each set will preferably be less than when a single set is used or a plurality of sets in multiple, for the reason that the compensating effect of each set of resistors will be supplemented by the compensating effect of the other set of resistors. If the voltage of the supply circuit should suddenly drop while the machines are regenerating, the current delivered to the supply circuit will also suddenly increase, but this will cause a greater voltage drop across the resistors 11 and 12, and that will decrease the effective voltage applied to the field windings and also decrease the effective voltage of the excitors so that the excitation of all of the machines is decreased. A balance is very quickly reached and a stable condition effected. In case there should be an increase of line potential, the voltage of the machines would be correspondingly increased, by reason of the inherent characteristics of the arrangement. The arrangement is therefore one in which the compensating effect for changes in line potential and in braking current is inherent in the arrangement, and no extra automatic apparatus is necessary. In order to vary the braking effect, the resistor 13 which shunts the exciter fields will be varied.

It will also be observed that in case the generated potential is less than the potential of the supply circuit, the direction of current in the armature circuit of the machines will be reversed, but the direction of current through the fields will remain the same as during braking. This will cause the machines to operate as motors. The arrangement has thus the advantage that either braking or motoring operation may be had as desired without changing the circuit connections. The motors E, $e$, and F, $f$, will have a characteristic which is in the nature of a shunt characteristic, and the remainder of the machines will have a characteristic which is in the nature of a series characteristic.

It will be understood that the machines are connected to either drive the load, such as a vehicle, or to be driven thereby so as to operate as braking generators, although it will be obvious in so far as certain aspects of my invention are concerned that the machines need not all be similar, nor need they all be used during motoring in case they are not all similar. Thus the exciter portion of the machines may be designed solely for this purpose and be driven by the load, but not necessarily used to drive the load.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. In a system of electric braking, a plurality of operatively connected dynamo electric machines having severally armature and field windings, a portion of said machines operating as a self-excited exciter connected in a local circuit with the fields of all of said machines, a resistance in the said local circuit, and connections whereby the braking current has a path through the said resistance and the armatures of said machines, the excitation of all of said machines is varied responsively to the variations of the braking current, and only the current in the local circuit passes through the field windings of said machines.

2. In a system of electric braking, a plurality of operatively connected dynamo electric machines, having severally armature and field windings, a portion of said machines operating as a self-excited exciter connected in local circuit with the fields of all of said machines, a resistance in the said local circuit, means for varying the current in the exciter field windings, and connections whereby the braking current has a path through the said resistance and the armatures of said machines, and only the current in the local circuit passes through the field windings of said machines.

3. In a system of electric braking, a plurality of operatively connected dynamo electric machines, a portion of said machines operating as a self-excited exciter connected in a local circuit with the fields of all of said machines, a resistance in the said local circuit, means for shunting a portion of the current in said local circuit around the exciter field windings, and connections whereby the braking current has a path through the said resistance and the armatures of said machines, the excitation of all of said machines is varied responsively to the variations of the braking current, and only the current in the local circuit passes through the field windings of said machines.

4. In a system of electric braking, a plurality of operatively connected dynamo electric machines, a portion of said machines operating as a self-excited exciter connected in a local circuit with the fields of all of said machines, a resistance in the said local circuit, a variable resistor shunting the exciter field windings, and connections whereby the braking current has a path through the said resistance and the armatures of said machines, the excitation of all of said machines is varied responsively to the variations of the braking current, and only the current in the local circuit passes through the field windings of said machines.

5. In a system of electric braking, a plurality of similar dynamo electric machines having severally armature and field windings, a plurality of which operate as self-excited exciters connected in multiple with each other and in series with the remainder of the armatures, the series fields of all the machines being connected in a local circuit with the exciter armatures so that only the local excitation current passes through the field windings of the machines and the excitation of all of the machines is varied responsively to variations of the braking current.

6. In a system of electric braking, a plurality of similar dynamo electric machines having severally armature and field windings, a plurality of said machines operating as self-excited exciters with their armatures connected in multiple with each other in series with the remainder of the armatures, the field windings of all the machines being connected in a local circuit with the exciter armatures, so that only the local excitation current passes through the field windings of the machines and the excitation of all of the machines is varied responsively to variations of the braking current and means for varying the current in the exciter field windings so as to vary the braking effect.

7. In a system of electric braking, a plurality of similar dynamo electric machines having severally armature and field windings, a plurality of said machines operating as self-excited exciters with their armatures connected in multiple with each other in series with the remainder of the armatures the field windings of all the machines being connected in a local circuit with the exciter armatures, so that only the local excitation current passes through the field windings of the machines and the excitation of all of the machines is varied responsively to variations of the braking current and means for shunting a portion of the current in the said local circuit around the exciter field windings.

8. In a system of electric braking, a plurality of similar dynamo electric machines having severally armature and field windings, two of the armatures of which operate as self-excited exciters connected in multiple with each other in series with the remainder of the armatures, the fields of all the machines being connected in a local circuit with the exciter armatures, so that only the local excitation current passes through the field windings of the machines.

9. In a system of electric braking, a plurality of dynamo electric machines having severally armature and field windings, two of the armatures of which operate as self-excited exciters connected in multiple with each other in series with the remainder of the armatures, the fields of all the machines being connected in a local circuit with the exciter armatures, so that only the local excitation current passes through the field windings of the machines and the excitation of all of the machines is varied responsively to variations of the braking current and means for varying the current in the exciter field windings so as to vary the braking effect.

10. In a system of electric braking, a plurality of similar dynamo electric machines having severally armature and field windings, a plurality of said machines operating as exciters with their armatures connected in multiple with each other in series with the remainder of the armatures, the fields of all the machines being connected in a local circuit with the exciter armatures, so that only the local excitation current passes through the field windings of the machines and the excitation of all of the machines is varied responsively to variations of the braking current and a shunt path of variable resistance around the exciter field windings.

11. In a system of electric braking, a plurality of operatively connected dynamo electric machines, having severally armature and field windings, a portion of which operate as self-excited exciters for the said machines, a balancing resistance in circuit with the armature windings of said portion, and connections whereby the field windings of said machines are connected in series relation in a local circuit to the exciter portion of the armatures and the balancing resistance, the connections being such that the braking current has a path through the balancing resistance and the armatures of said machines, and only the current in the local circuit passes through the field windings of the machines.

12. In a system of electric braking, a plurality of dynamo electric machines having severally armature and field windings, a plurality of which operate as exciters with their armatures connected in multiple with each other in series with the remainder of the armatures, the fields of all of the machines being connected in a local circuit with the exciter armatures, so that only the local excitation current passes through the field windings of the machines and the excitation of all of the machines is varied responsively to variations of the braking current and a resistor connected in series with each exciter armature.

13. In a system of electric braking, a plurality of dynamo electric machines having severally armature and field windings, a portion of said machines operating self-excited furnishing excitation for said machines, a balancing resistance in the armature circuit of said exciter portion of the machines, a resistor shunting the field windings of the exciter portion of the machines, and connections whereby the braking current has a path through the said balancing resistance and only the excitation current passes through the field windings of said machines.

14. In a system of electric braking a plurality of dynamo electric machines having severally armature and field windings, a plurality of which operate as self-excited exciters with their armatures connected in multiple with each other in series with the remainder of the armatures, a resistor in the armature circuit of each exciter, the fields of all of the machines being connected in a local circuit with the said multiple circuit having the exciter armatures therein, so that only the local excitation current passes through the field windings of said machines and the excitation of all of the machines is varied responsively to variations of the braking current, and a shunt path of variable resistance around the exciter field windings.

15. In a system of regenerative braking, a supply circuit, a plurality of similar dynamo electric machines operatively connected to the supply circuit, a portion of the said machines operating as exciters with their armatures connected in multiple relation in series with the armatures of the remainder of the machines, a resistor in the circuit of each exciter armature, the field windings of all of said machines being connected in series relation in a local circuit to the said multiple circuit including the exciter armatures, so that only the local excitation current passes through the field windings of said machines and the excitation of all of the machines is varied responsively to variations of the braking current and a variable resistor shunting the field windings of the exciters.

16. In a system of power transmission and regenerative braking, a source of supply, a plurality of dynamo electric machines connected to the source, a portion of said machines operating as a self-excited exciter connected in a local circuit with the field windings of said machines, and connections whereby all of the machines operate either as braking generators or as motors, depending on the generated potential of the machines.

17. In a system of power transmission and regenerative braking, a source of supply, a plurality of dynamo electric machines connected to the source, a portion of the armatures of said machines connected in a local circuit with the field windings of said machines, the armatures of said machines operatively connected to each other across the source of supply, the said portion operating as a self-excited exciter for the remainder of the machines for braking, a resistor in the said local circuit, and connections whereby during braking the braking current passes through the armatures of said machines and only the current in the local circuit passes through the field windings of the machines, and during motoring the direction of current is reversed in the armature circuit of said machines and remains the same in the field circuit.

18. In a system of power transmission and regenerative braking, a source of supply, a plurality of similar dynamo electric machines connected to the source, a portion of said machines operating as a self-excited exciter connected in a local circuit with the field windings of all of said machines, a resistor in the armature circuit of the exciter portion of the machines, and connections whereby all of the machines operate either as braking generators or as motors, depending upon the generated potential of the machines.

19. In a system of power transmission and regenerative braking, a source of supply, a plurality of similar dynamo electric machines connected to the source, two of said machines having their armatures connected in multiple operating as self-excited exciters connected in a local circuit with the field windings of said machines and in series with the remainder of the armatures across the source of supply, a resistor in series with each exciter armature, and connections whereby all of the machines operate either as braking generators or as motors, depending upon the generated potential of the machines.

In witness whereof, I have hereunto set my hand this 10th day of September, 1920

ASA F. BATCHELDER.